United States Patent
Shin et al.

(10) Patent No.: US 12,552,964 B2
(45) Date of Patent: Feb. 17, 2026

(54) ADHESIVE COMPOSITION, ADHESIVE LAYER FORMED THEREFROM, AND OPTICAL DISPLAY DEVICE COMPRISING SAME

(71) Applicant: SAMSUNG SDI CO., LTD., Yongin-si (KR)

(72) Inventors: Dong Myeong Shin, Suwon-si (KR); Do Young Kim, Suwon-si (KR); Il Jin Kim, Suwon-si (KR); Ji Yeon Kim, Suwon-si (KR); Sung Hyun Mun, Suwon-si (KR); Gwang Hwan Lee, Suwon-si (KR); Ji Young Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 690 days.

(21) Appl. No.: 17/995,828

(22) PCT Filed: Apr. 6, 2021

(86) PCT No.: PCT/KR2021/004265
§ 371 (c)(1),
(2) Date: Oct. 7, 2022

(87) PCT Pub. No.: WO2021/206411
PCT Pub. Date: Oct. 14, 2021

(65) Prior Publication Data
US 2023/0151246 A1 May 18, 2023

(30) Foreign Application Priority Data
Apr. 7, 2020 (KR) .................. 10-2020-0042438

(51) Int. Cl.
*C08F 2/46* (2006.01)
*C08F 2/50* (2006.01)
*C08G 61/04* (2006.01)
*C09J 4/06* (2006.01)
*C09J 11/06* (2006.01)
*C09J 133/06* (2006.01)

(52) U.S. Cl.
CPC .................. *C09J 4/06* (2013.01); *C09J 11/06* (2013.01); *C09J 133/066* (2013.01)

(58) Field of Classification Search
CPC .... C09J 133/04; C09J 133/066; C09J 133/08; C09J 133/06; C09J 11/06; C09J 7/10; C09J 4/06; C09J 2433/00; C09J 2203/318; C09J 2301/312; C09D 4/06; C08F 220/06; C08F 220/14; C08F 220/1808; C08F 220/20; C08F 220/1811; C08F 220/30; C08F 220/281; C08F 220/301; C08F 265/06; C08F 222/102
USPC .... 522/41, 40, 33, 6, 189, 184, 71, 1; 520/1
See application file for complete search history.

(56) References Cited

U.S. PATENT DOCUMENTS

| | | | |
|---|---|---|---|
| 5,900,473 A | 5/1999 | Acevedo et al. | |
| 2016/0342085 A1 | 11/2016 | Sakai et al. | |
| 2017/0121564 A1 | 5/2017 | Cho et al. | |

FOREIGN PATENT DOCUMENTS

| | | | |
|---|---|---|---|
| JP | 2018-178013 A | | 11/2018 |
| KR | 10-2007-0055363 A | | 5/2007 |
| KR | 10-2009-0126904 A | | 12/2009 |
| KR | 10-1685520 B1 | | 12/2016 |
| KR | 10-2017-0070753 A | | 6/2017 |
| KR | 20170070753 | * | 6/2017 |
| WO | WO 2013/055015 A1 | | 4/2013 |

OTHER PUBLICATIONS

Hamada et al, KR 1020170070753 Machine Translation, Jun. 22, 2017 (Year: 2017).*
Chinese Office Action dated Jan. 22, 2025, issued in corresponding Chinese Patent Application No. 202180040748.2 (6 pages).
International Search Report of PCT/KR2021/004265, Jul. 20, 2021, 4 pp.

* cited by examiner

*Primary Examiner* — Jessica Whiteley
(74) *Attorney, Agent, or Firm* — Womble Bond Dickinson (US) LLP

(57) ABSTRACT

Provided are: an adhesive composition comprising (i) (meth)acrylic prepolymer having a hydroxyl group and an alkyl group, and (ii) at least one of an aromatic group-containing (meth)acrylate, an alicyclic group-containing (meth)acrylate, and a heteroalicyclic group-containing (meth)acrylate, and having a shear viscosity of about 0.04 Pa·s or less at 40° C., wherein an adhesive layer formed of the adhesive composition has a modulus of about 0.3 MPa or less at −20° C. and a peel strength of about 400 gf/in or more; an adhesive layer formed therefrom; and an optical display device comprising same.

13 Claims, No Drawings

ADHESIVE COMPOSITION, ADHESIVE LAYER FORMED THEREFROM, AND OPTICAL DISPLAY DEVICE COMPRISING SAME

CROSS-REFERENCE TO RELATED APPLICATIONS

This application is a U.S. National Phase Patent Application of International Application Number PCT/KR2021/004265, filed on Apr. 6, 2021, which claims priority to Korean Patent Application Number 10-2020-0042438, filed on Apr. 7, 2020, the entire content of each of which is incorporated herein by reference.

TECHNICAL FIELD

The present invention relates to an adhesive composition, an adhesive layer formed therefrom, and an optical display device including the same.

BACKGROUND ART

An optical display device includes a plurality of elements. For example, the plurality of elements may include a display panel, various films, various optical sheets, and the like. In the optical display device, these elements are stacked via adhesive layers instead of being simply stacked one above another, thereby securing stability while performing inherent functions thereof.

In general, the optical display device is produced by stacking such elements via the adhesive layers separately produced. The adhesive layer may be produced in the form of a roll by coating an adhesive composition to a predetermined thickness between release films and may be cut to a suitable size and shape in use. However, this method requires an additional process, such as a punching process and the like.

Accordingly, there is proposed a process of directly spraying an adhesive composition onto an element by inkjet printing, followed by curing the adhesive composition. In this regard, a typical optically clear resin (OCR) composition, which is a liquid-phase adhesive composition containing an oligomer and a plasticizer acting as a softening component, such as isoprene and butadiene, is used in the art. This type of adhesive composition is applied by a dispensing process instead of an inkjet printing process due to increase in viscosity thereof. However, the dispensing process disadvantageously takes more time than the inkjet printing process and the adhesive composition is unlikely to realize low temperature modulus for flexibility for foldable or flexible displays. In order to address these problems, an adhesive composition prepared by reducing the molecular weight of the oligomer or the plasticizer (softening component) or prepared using a reactive diluted monomer having low viscosity is used in the art. However, this type of adhesive composition is also unsuitable for inkjet printing and fails to improve flexural resistance.

The background technique of the present invention is disclosed in Korean Patent Laid-open Publication No. 10-2007-0055363 and the like.

DISCLOSURE

Technical Problem

It is one aspect of the present invention to provide an adhesive composition applicable to an inkjet printing or dispensing process.

It is another aspect of the present invention to provide an adhesive composition that can realize an adhesive layer having good flexibility at low temperature.

Technical Solution

One aspect of the present invention relates to an adhesive composition.

1. The adhesive composition may include: (i) a (meth)acrylic prepolymer having a hydroxyl group and an alkyl group; and (ii) at least one selected from among an aromatic group-containing (meth)acrylate, an alicyclic group-containing (meth)acrylate, and a heteroalicyclic group-containing (meth)acrylate, and has a shear viscosity of about 0.04 Pa·s or less at 40° C., wherein an adhesive layer formed of the adhesive composition has a modulus of about 0.3 MPa or less at −20° C. and a peel strength of about 400 gf/in or more.

2. In 1, the adhesive composition may be a solvent-free liquid adhesive composition.

3. In 1 and 2, the (meth)acrylic prepolymer having a hydroxyl group and an alkyl group may include a (meth)acrylic prepolymer of a monomer mixture including about 10% by weight (wt %) to about 40 wt % of a hydroxyl group-containing (meth)acrylate and about 60 wt % to about 90 wt % of an alkyl group-containing (meth)acrylate.

4. In 3, the alkyl group-containing (meth)acrylate may include a compound represented by Formula 1.

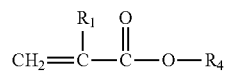

[Formula 1]

where $R_1$ is hydrogen or a methyl group and $R_4$ is an unsubstituted linear or branched $C_1$ to $C_{10}$ alkyl group.

5. In 1 to 4, the (meth)acrylic prepolymer having a hydroxyl group and an alkyl group may have a weight average molecular weight of about 1,500,000 or less.

6. In 1 to 5, the (meth)acrylic prepolymer having a hydroxyl group and an alkyl group may have a shear viscosity or about 0.05 Pa·s or less at 40° C.

7. In 1 to 6, the at least one selected from among the aromatic group-containing (meth)acrylate, the alicyclic group-containing (meth)acrylate, and the heteroalicyclic group-containing (meth)acrylate may be present in an amount of about 15 parts by weight or more relative to 100 parts by weight of the (meth)acrylic prepolymer having a hydroxyl group and an alkyl group.

8. In 1 to 7, the aromatic group-containing (meth)acrylate may include at least one selected from among benzyl (meth)acrylate and phenoxy ethyl (meth)acrylate.

9. In 1 to 8, the alicyclic group-containing (meth)acrylate may include at least one selected from among dicyclopentanyl (meth)acrylate and dicyclopentenyloxyethyl (meth)acrylate.

10. In 1 to 9, the heteroalicyclic group-containing (meth)acrylate may include at least one selected from among tetrahydrofurfuryl (meth)acrylate and cyclic trimethylolpropane formal (meth)acrylate.

11. In 1 to 10, the adhesive composition may include at least one selected from among an initiator and a plasticizer.

An adhesive layer according to the present invention includes a cured product formed of the adhesive composition according to the present invention.

An optical display device according to the present invention includes the adhesive layer according to the present invention.

Advantageous Effects

The present invention provides an adhesive composition applicable to an inkjet printing or dispensing process.

The present invention provides an adhesive composition that can realize an adhesive layer having good flexibility at low temperature.

BEST MODE

Hereinafter, embodiments of the present invention will be described in detail with reference to the accompanying drawings such that the present invention can be easily implemented by a person having ordinary knowledge in the art. It should be understood that the present invention may be embodied in different ways and is not limited to the following embodiments.

Herein, "viscosity" of an adhesive composition means shear viscosity measured with respect to the adhesive composition using a viscometer at 40° C. Specifically, shear viscosity of the adhesive composition may be measured with respect to 0.5 g of the adhesive composition using a Brookfield viscometer RVDV-II+P CP (Spindle #51, 20 rpm) after adjusting the temperature of the adhesive composition to 40° C.

Herein, "modulus" refers to storage modulus G' measured with respect to an adhesive layer formed of an adhesive composition. Specifically, storage modulus is measured in a temperature sweep test mode using a rheometer (ARES, Anton Paar, MCR-501) as a dynamic viscoelasticity meter at a shear rate of 1 rad/sec and at a strain of 1% under an auto-strain condition. A specimen for measurement of storage modulus was prepared by stacking multiple adhesive layers to form a laminate having a thickness of 400 μm, followed by punching the laminate using an 8 mm-diameter punching machine. Specifically, with a normal force of 1 N applied to the specimen using 8 mm jigs, storage modulus was measured on the specimen while elevating the temperature from −50° C. to 100° C. at a heating rate of 5° C./min.

Herein, "peel strength" is a value measured with respect to an adhesive layer formed of an adhesive composition. Specifically, a specimen for measurement of peel strength was prepared by attaching a polyethylene terephthalate (PET) film (length×width×thickness: 100 mm×25 mm×100 μm) subjected to corona treatment to one surface of the adhesive layer (length×width×thickness: 100 mm×25 mm×25 μm) while attaching a glass plate (soda lime glass) (length×width×thickness: 100 mm×25 mm×100 μm) to the other surface of the adhesive layer. The PET film subjected to corona treatment was prepared by subjecting one surface of the PET film to corona treatment twice (total dose: 156 doses) while plasma discharging at 78 doses for each treatment. The specimen was left at room temperature for 30 minutes and then secured to a TA.XT_Plus Texture Analyzer (Stable Micro Systems). Then, peel strength was measured upon peeling the entirety of the corona-treated PET film and the adhesive layer from a glass plate under conditions of peeling temperature: 25° C., peeling angle: 180°, and peeling rate: 300 mm/min.

Herein, "(meth)acryl" may mean acryl and/or methacryl.

Herein, in "substituted or unsubstituted", "substituted" means that at least one hydrogen atom in a corresponding functional group is substituted with a halogen, a hydroxyl group, an amino group, a $C_1$ to $C_{10}$ alkyl group, a $C_3$ to $C_{10}$ cycloalkyl group, a $C_6$ to $C_{20}$ aryl group, or a $C_7$ to $C_{20}$ aryl alkyl group.

As used herein to represent a specific numerical range, "X to Y" means "greater than or equal to X and less than or equal to Y (X≤ and ≤Y)".

Hereinafter, an adhesive composition according to one embodiment of the present invention will be described.

The adhesive composition may be suitably applied to an inkjet printing process or a dispensing process. The inkjet printing process or the dispensing process means a process that allows application of the adhesive composition onto a matrix to form a smooth and uniform adhesive layer through an inkjet head at 25° C. to 50° C., preferably 40° C., and bonds the matrix to an adherend by bonding the adherend to the adhesive layer, followed by curing.

For the inkjet printing process or the dispensing process, the adhesive composition has a shear viscosity of about 0.04 Pa·s or less at 40° C. in order to allow application of the adhesive composition onto a matrix while securing a uniform coating layer. With this viscosity, the adhesive composition allows efficient application by the inkjet printing process while securing good spreading on the matrix so as to form a uniform coating layer, whereby various films and/or display panels of an optical display device can be bonded by the adhesive composition. Preferably, the adhesive composition has a shear viscosity of about 0.005 Pa·s to about 0.04 Pa·s at 40° C. Within this range, the adhesive composition is applicable to the inkjet printing process or the dispensing process. In addition, within this range, an adhesive layer formed of the adhesive composition can easily secure flexibility through adjustment of peel strength and modulus at low temperature. For example, the adhesive composition may have a shear viscosity at 40° C. of about 0.005, 0.006, 0.007, 0.008, 0.009, 0.010, 0.011, 0.012, 0.013, 0.014, 0.015, 0.016, 0.017, 0.018, 0.019, 0.020, 0.021, 0.022, 0.023, 0.024, 0.025, 0.026, 0.027, 0.028, 0.029, 0.030, 0.031, 0.032, 0.033, 0.034, 0.035, 0.036, 0.037, 0.038, 0.039, or 0.040 Pa·s.

The adhesive composition can realize an adhesive layer exhibiting good flexibility at low temperature. To this end, the adhesive layer formed of the adhesive composition may have a modulus of about 0.3 MPa or less at −20° C. and a peel strength of about 400 gf/in or more. Within these ranges of modulus and peel strength, the adhesive layer has good flexibility at low temperature to prevent delamination or bubble generation, slight lifting or appearance deformation upon 100,000 or more cycles of folding at low temperature. Preferably, the adhesive layer has a modulus of about 0.07 MPa to about 0.3 MPa at −20° C. Preferably, the adhesive layer has a peel strength of about 400 gf/in to about 1500 gf/in.

For example, the adhesive layer may have a modulus at −20° C. of about 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30 MPa.

For example, the adhesive layer may have a peel strength of about 400, 450, 500, 550, 600, 650, 700, 750, 800, 850, 900, 950, 1000, 1050, 1100, 1150, 1200, 1250, 1300, 1350, 1400, 1450, or 1500 gf/in.

To allow formation of an adhesive layer while securing viscosity, modulus and peel strength within the above ranges, the adhesive composition includes a (meth)acrylic prepolymer having a hydroxyl group and an alkyl group.

With a weight average molecular weight and/or viscosity within certain ranges, the (meth)acrylic prepolymer having a hydroxyl group and an alkyl group can secure the above viscosity range. Here, "prepolymer" is distinguished from a polymer having a high weight average molecular weight and any polymer having a weight average molecular weight and/or viscosity within the following ranges may be included in the prepolymer according to the present invention.

The (meth)acrylic prepolymer having a hydroxyl group and an alkyl group may have a weight average molecular weight of about 1,500,000 or less, for example, about 500,000 to about 1,500,000. Within this range, the adhesive composition can easily reach viscosity within the above range and can easily secure peel strength and various properties. Even with at least one selected from among an aromatic group-containing (meth)acrylate, an alicyclic group-containing (meth)acrylate, and a heteroalicyclic group-containing (meth)acrylate described below, it can be difficult for the adhesive composition to secure peel strength and modulus according to the present invention when the (meth)acrylic prepolymer has a weight average molecular weight not within the above range. For example, the (meth) acrylic prepolymer having a hydroxyl group and an alkyl group may have a weight average molecular weight of about 500,000, 600,000, 700,000, 800,000, 900,000, 1,000,000, 1,100,000, 1,200,000, 1,300,000, 1,400,000, or 1,500,000.

The (meth)acrylic prepolymer having a hydroxyl group and an alkyl group may have a shear viscosity at 40° C. of about 0.05 Pa·s or less, for example, about 0.03 Pa·s to about 0.05 Pa·s. Within this range, the adhesive composition can easily reach viscosity within the above range and can easily secure peel strength and various properties. Viscosity of the (meth)acrylic prepolymer may be measured by a method described below. Even with at least one selected from among the aromatic group-containing (meth)acrylate, the alicyclic group-containing (meth)acrylate, and the heteroalicyclic group-containing (meth)acrylate described below, it can be difficult for the adhesive composition to secure peel strength and modulus according to the present invention when the (meth)acrylic prepolymer has viscosity not within this range. For example, the (meth)acrylic prepolymer having a hydroxyl group and an alkyl group may have a shear viscosity at 40° C. of about 0.030, 0.031, 0.032, 0.033, 0.034, 0.035, 0.036, 0.037, 0.038, 0.039, 0.040, 0.041, 0.042, 0.043, 0.044, 0.045, 0.046, 0.047, 0.048, 0.049, or 0.050 Pa·s.

In one embodiment, the adhesive composition may be a solvent-free liquid composition that does not contain a solvent. When the adhesive composition is a solvent-free adhesive composition, the (meth)acrylic prepolymer has a weight average molecular weight and/or viscosity within the above ranges, whereby the adhesive composition can easily reach viscosity within the range according to the present invention.

The (meth)acrylic prepolymer having a hydroxyl group and an alkyl group may include a (meth)acrylic prepolymer of a monomer mixture including a hydroxyl group-containing (meth)acrylate and an alkyl group-containing (meth) acrylate.

The hydroxyl group-containing (meth)acrylate can assist in securing peel strength of the adhesive layer. The hydroxyl group-containing (meth)acrylate may be a $C_1$ to $C_{10}$ (meth) acrylate having at least one hydroxyl group. For example, the hydroxyl group-containing (meth)acrylate may include at least one selected from among 2-hydroxybutyl (meth) acrylate, 4-hydroxybutyl (meth)acrylate, 2-hydroxyethyl (meth)acrylate, 2-hydroxypropyl (meth)acrylate, 3-hydroxypropyl (meth)acrylate, and 6-hydroxyhexyl (meth) acrylate.

In the monomer mixture, the hydroxyl group-containing (meth)acrylate may be present in an amount of about 10 wt % to about 40 wt %, for example, about 10 wt % to about 30 wt %. Within this range, the adhesive composition can further improve peel strength and durability of the adhesive layer formed thereof. For example, the hydroxyl group-containing (meth)acrylate may be present in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt % in the monomer mixture.

The alkyl group-containing (meth)acrylate may form a matrix of the adhesive layer. Here, "alkyl group" may mean an unsubstituted linear or branched $C_1$ to $C_{10}$ alkyl group. The alkyl group-containing (meth)acrylate may include a compound of Formula 1.

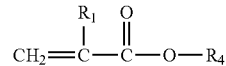

[Formula 1]

In Formula 1,
$R_1$ is hydrogen or a methyl group, and
$R_4$ is an unsubstituted linear or branched $C_1$ to $C_{10}$ alkyl group.

In one embodiment, the alkyl group-containing (meth) acrylate is an unsubstituted linear or branched $C_1$ to $C_{10}$ alkyl group-containing (meth)acrylate. For example, the alkyl group-containing (meth)acrylate may include at least one selected from among 2-ethylhexyl (meth)acrylate, n-butyl (meth)acrylate, iso-octyl (meth)acrylate, propyl (meth)acrylate, t-butyl (meth)acrylate, iso-butyl (meth)acrylate, pentyl (meth)acrylate, hexyl (meth)acrylate, heptyl (meth)acrylate, octyl (meth)acrylate, nonyl (meth)acrylate, and decyl (meth)acrylate. Preferably, the alkyl group-containing (meth)acrylate includes at least one selected from among 2-ethylhexyl (meth)acrylate, n-butyl (meth)acrylate, and iso-octyl (meth)acrylate, more preferably 2-ethylhexyl (meth)acrylate.

In the monomer mixture, the alkyl group-containing (meth)acrylate may be present in an amount of about 60 wt % to about 90 wt %, preferably about 70 wt % to about 90 wt %. Within this range, the adhesive composition can secure good flexural reliability of the adhesive layer at low temperature and high temperature/humidity. For example, the alkyl group-containing (meth)acrylate may be present in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % in the monomer mixture.

The monomer mixture may further include a copolymer polymerizable with the hydroxyl group-containing (meth) acrylate and/or the alkyl group-containing (meth)acrylate. Here, the comonomer does not contain an aromatic group-containing (meth)acrylate, an alicyclic group-containing (meth)acrylate, and a heteroalicyclic group-containing (meth)acrylate. When the monomer mixture contains the aromatic group-containing (meth)acrylate, the alicyclic group-containing (meth)acrylate, and the heteroalicyclic group-containing (meth)acrylate, the adhesive composition prepared from the monomer mixture can suffer from high reactivity between the hydroxyl group-containing (meth) acrylate and the alkyl group-containing (meth)acrylate, thereby making it difficult to perform the inkjet printing process or the dispensing process due to gelation of the adhesive composition. In one embodiment, the (meth)

acrylic prepolymer may not contain an aromatic group, an alicyclic group and a heteroalicyclic group.

The comonomer may include at least one selected from among a phosphorus-containing (meth)acrylic monomer, a silane group-containing (meth)acrylic monomer, an epoxy group-containing (meth)acrylic monomer, and an alkylene oxide group-containing (meth)acrylic monomer, without being limited thereto. In the monomer mixture, the comonomer may be present in an amount of about 30 wt % or less, for example, about 0.1 wt % to about 30 wt %. For example, the comonomer may be present in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt % in the monomer mixture.

The (meth)acrylic prepolymer having a hydroxyl group and an alkyl group may be prepared through polymerization of the monomer mixture. Here, polymerization may be performed to secure the weight average molecular weight and/or viscosity within the above ranges. For example, upon polymerization, a chain transfer agent may be present in an amount of about 50 ppm to about 300 ppm, for example, about 50 ppm to about 200 ppm, relative to 100 parts by weight of the monomer mixture. Polymerization may be realized by solution polymerization, suspension polymerization, and the like, without being limited thereto. The chain transfer agent may include at least one selected from among a silane compound, a mercapto compound, a dithioacetate compound, a xanthate compound, and a dithioester compound. Details of these compounds can be easily obtained with reference to typical compounds well-known to those skilled in the art.

On the other hand, an adhesive layer formed of the adhesive composition having a shear viscosity of about 0.04 Pa·s or less at 40° C. has a problem of low peel strength due to low viscosity of the adhesive composition, which allows application by the inkjet printing process or the dispensing process. In addition, low viscosity of the adhesive composition can cause the adhesive layer to fail to secure a target modulus at low temperature. As a result, the adhesive layer can exhibit poor flexibility.

Accordingly, the adhesive composition may further include at least one selected from among the aromatic group-containing (meth)acrylate, the alicyclic group-containing (meth)acrylate, and the heteroalicyclic group-containing (meth)acrylate in the (meth)acrylic prepolymer having a hydroxyl group and an alkyl group.

The at least one selected from among the aromatic group-containing (meth)acrylate, the alicyclic group-containing (meth)acrylate, and the heteroalicyclic group-containing (meth)acrylate can improve flexibility at low temperature by improving peel strength of the adhesive layer while securing modulus at low temperature and peel strength within the ranges according to the present invention without affecting shear viscosity at 40° C. secured by the (meth)acrylic prepolymer having a hydroxyl group and an alkyl group.

The at least one selected from among the aromatic group-containing (meth)acrylate, the alicyclic group-containing (meth)acrylate, and the heteroalicyclic group-containing (meth)acrylate may be present in an amount of about 15 parts by weight or more, for example, about 15 parts by weight to about 50 parts by weight, relative to 100 parts by weight of the (meth)acrylic prepolymer having a hydroxyl group and an alkyl group or the monomer mixture for the (meth)acrylic prepolymer. Within this range, the adhesive composition can secure viscosity within the above range and good peel strength and flexibility at low temperature. For example, the at least one selected from among the aromatic group-containing (meth)acrylate, the alicyclic group-containing (meth)acrylate, and the heteroalicyclic group-containing (meth)acrylate may be present in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight relative to 100 parts by weight of the (meth)acrylic prepolymer having a hydroxyl group and an alkyl group or the monomer mixture for the (meth)acrylic prepolymer.

The aromatic group-containing (meth)acrylate may include a mono-functional (meth)acrylate having an aromatic group. The aromatic group means a monocyclic aromatic group, a polycyclic aromatic group including a fused aromatic group, or a monocyclic aromatic group having a sigma bond. For example, the aromatic group may include at least one selected from among a substituted or unsubstituted $C_6$ to $C_{50}$ aryl group, a substituted or unsubstituted $C_6$ to $C_{50}$ aryloxy group, a substituted or unsubstituted $C_7$ to $C_{50}$ aryl alkyl group, and a substituted or unsubstituted $C_7$ to $C_{50}$ aryl alkoxy group. More specifically, the aromatic group may include at least one selected from among phenyl, a phenoxy group, biphenyl, terphenyl, quaterphenyl, naphthyl, anthracenyl, phenanthrenyl, chrysenyl, triphenylenyl, tetracenyl, pyrenyl, benzopyrenyl, pentacenyl, coronenyl, ovalenyl, corannulenyl, and benzyl.

For example, the mono-functional (meth)acrylate containing an aromatic group may be represented by Formula 2.

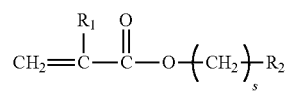

[Formula 2]

In Formula 2,
$R_1$ is hydrogen or a methyl group,
s is an integer of 0 to 10, and
$R_2$ is a substituted or unsubstituted $C_6$ to $C_{50}$ aryl group or a substituted or unsubstituted $C_6$ to $C_{50}$ aryloxy group.

For example, $R_2$ may be a phenyl phenoxyethyl group, a phenoxyethyl group, a benzyl group, a phenyl group, a phenyl phenoxy group, a phenoxy group, a phenyl ethyl group, a phenyl propyl group, a phenyl butyl group, a methyl phenyl ethyl group, a propyl phenyl ethyl group, a methoxyphenyl ethyl group, a cyclohexyl phenyl ethyl group, a chlorophenyl ethyl group, a bromophenyl ethyl group, a methyl phenyl group, a methyl ethyl phenyl group, a methoxyphenyl group, a propyl phenyl group, a cyclohexyl phenyl group, a chlorophenyl group, a bromophenyl group, a phenylphenyl group, a biphenyl group, a terphenyl group, a quaterphenyl group, an anthracenyl group, a naphthalenyl group, a triphenylenyl group, a methylphenoxy group, an ethyl phenoxy group, a methyl ethyl phenoxy group, a methoxyphenyloxy group, a propyl phenoxy group, a cyclohexyl phenoxy group, a chlorophenoxy group, a bromophenoxy group, a biphenyloxy group, a terphenyloxy group, a quaterphenyloxy group, an anthracenyloxy group, a naphthalenyloxy group, and a triphenylenyloxy.

Specifically, the mono-functional (meth)acrylate containing an aromatic group may include at least one selected from among 2-phenyl phenoxyethyl (meth)acrylate, phenoxyethyl (meth)acrylate, phenyl (meth)acrylate, phenoxy (meth)acrylate, 2-ethylphenoxy (meth)acrylate, benzyl (meth)acrylate, 2-phenyl ethyl (meth)acrylate, 3-phenyl propyl (meth)acrylate, 4-phenyl butyl (meth)acrylate, 2-(2-methylphenyl)ethyl (meth)acrylate, 2-(3-methylphenyl)ethyl (meth)

acrylate, 2-(4-methylphenyl)ethyl (meth)acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth)acrylate, 2-(3-chlorophenyl) ethyl (meth)acrylate, 2-(4-chlorophenyl)ethyl (meth)acrylate, 2-(4-bromophenyl)ethyl (meth)acrylate, 2-(3-phenylphenyl)ethyl (meth)acrylate, 4-(biphenyl-2-yloxy)butyl (meth)acrylate, 3-(biphenyl-2-yloxy)butyl (meth)acrylate, 2-(biphenyl-2-yloxy)butyl (meth)acrylate, 1-(biphenyl-2-yloxy)butyl (meth)acrylate, 4-(biphenyl-2-yloxy)propyl (meth)acrylate, 3-(biphenyl-2-yloxy)propyl (meth)acrylate, 2-(biphenyl-2-yloxy)propyl (meth)acrylate, 1-(biphenyl-2-yloxy)propyl (meth)acrylate, 4-(biphenyl-2-yloxy)ethyl (meth)acrylate, 3-(biphenyl-2-yloxy)ethyl (meth)acrylate, 2-(biphenyl-2-yloxy)ethyl (meth)acrylate, 1-(biphenyl-2-yloxy)ethyl (meth)acrylate, 2-(4-benzylphenyl)ethyl (meth) acrylate, 1-(4-benzylphenyl)ethyl (meth)acrylate, or structural isomers thereof.

Preferably, the aromatic group-containing (meth)acrylate includes at least one selected from among benzyl (meth)acrylate and phenoxyethyl (meth)acrylate.

The alicyclic group-containing (meth)acrylate may include a mono(meth)acrylate having a $C_3$ to $C_{10}$ monocyclic or polycyclic ring consisting of carbon atoms. For example, the alicyclic group-containing (meth)acrylate may include a compound represented by Formula 3.

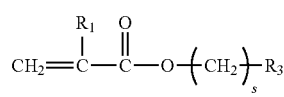

[Formula 3]

In Formula 3, $R_1$ is hydrogen or a methyl group, s is an integer of 0 to 10, and $R_3$ is a substituted or unsubstituted $C_3$ to $C_{10}$ cycloalkyl group, a substituted or unsubstituted $C_3$ to $C_{10}$ cycloalkenyl group, a substituted or unsubstituted $C_3$ to $C_{10}$ cycloalkyloxy group, or a substituted or unsubstituted $C_3$ to $C_{10}$ cycloalkenyloxy group.

Specifically, $R_3$ may be includes at least one selected from among a dicyclopentanyl group and a dicyclopentanyloxy group.

Preferably, the alicyclic group-containing (meth)acrylate may include at least one selected from among dicyclopentanyl (meth)acrylate and dicyclopentenyloxyethyl (meth)acrylate.

The heteroalicyclic group-containing (meth)acrylate may include a mono(meth)acrylate having a $C_3$ to $C_{10}$ monocyclic or polycyclic ring containing a hetero atom (for example, oxygen, sulfur, nitrogen, preferably oxygen) among atoms constituting the ring. For example, the heteroalicyclic group-containing (meth)acrylate may include at least one selected from among tetrahydrofurfuryl (meth)acrylate and cyclic trimethylolpropane formal (meth)acrylate.

The adhesive composition is a photocurable adhesive composition and may further include an initiator. The initiator may include a photo-polymerizable initiator.

The photo-polymerizable initiator may be selected from any kind of photo-polymerizable initiator capable of inducing polymerization of a radical polymerizable compound described below in a curing process by irradiation with light and the like. For example, the photo-polymerizable initiator may be a benzoin, hydroxy ketone, amino ketone or phosphine oxide photoinitiator.

The initiator may be present in an amount of about 0.0001 parts by weight to about 5 parts by weight, specifically about 0.001 parts by weight to about 3 parts by weight, more specifically about 0.001 parts by weight to about 1 part by weight, relative to 100 parts by weight of the monomer mixture or the (meth)acrylic prepolymer. Within this range, the initiator allows complete curing of the adhesive composition without deterioration in light transmittance of an adhesive film due to residual initiator and can reduce bubble generation while securing good reactivity. For example, the initiator may be present in an amount of about 0.0001, 0.005, 0.01, 0.05, 0.1, 0.2, 0.3, 0.4, 0.5, 0.6, 0.7, 0.8, 0.9, 1, 2, 3, 4, or 5 parts by weight relative to 100 parts by weight of the monomer mixture or the (meth)acrylic prepolymer.

The adhesive composition initiator may further include a crosslinking agent.

The crosslinking agent can improve mechanical strength of the adhesive layer through improvement in crosslinking degree of the adhesive composition.

The crosslinking agent may include a polyfunctional (meth)acrylate as a crosslinking agent capable of curing by actinic radiation. For example, the crosslinking agent may include bifunctional (meth)acrylates, such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxy ethyl isocyanurate, allylated cyclohexyl di(meth)acrylate, tricyclodecane dimethanol (meth)acrylate, dimethylol dicyclopentane di(meth) acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate, and 9,9-bis[4-(2-acryloyloxyethoxy)phenyl]fluorine; trifunctional (meth)acrylates, such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth) acrylate, trifunctional urethane (meth)acrylates, and tris (meth)acryloxyethyl isocyanurate; tetrafunctional (meth) acrylates, such as diglycerin tetra(meth)acrylate and pentaerythritol tetra(meth)acrylate; pentafunctional (meth) acrylates, such as dipentaerythritol penta(meth)acrylate; and hexafunctional (meth)acrylates, such as dipentaerythritol hexa(meth)acrylate, caprolactone-modified dipentaerythritol hexa(meth)acrylate, and urethane (meth)acrylates (e.g. a reaction product of an isocyanate monomer and trimethylolpropane tri(meth)acrylate), without being limited thereto.

Relative to 100 parts by weight of the monomer mixture or the (meth)acrylic prepolymer, the crosslinking agent may be optionally present in an amount of about 5 parts by weight or less, specifically about 0.001 parts by weight to about 5 parts by weight, specifically about 0.003 parts by weight to about 3 parts by weight, specifically about 0.005 parts by weight to about 1 part by weight. Within this range, the adhesive composition can secure good peel strength while improving reliability. For example, the crosslinking agent may be optionally present in an amount of about 0, 0.001, 0.005, 0.01, 0.05, 0.1, 0.2, 0.3, 0.4, 0.5, 0.6, 0.7, 0.8, 0.9, 1, 2, 3, 4, or 5 parts by weight relative to 100 parts by weight of the monomer mixture or the (meth)acrylic prepolymer.

The adhesive composition may further include additives.

The additives may be selected from typical additives for adhesive compositions, which are well known to those skilled in the art. For example, the additives may include at least one selected from among a pigment, a UV absorbent, a leveling agent, an antistatic agent, and a silane coupling agent, without being limited thereto.

The adhesive composition may be prepared by preparing a (meth)acrylic prepolymer containing a hydroxyl group and an alkyl group through polymerization of a monomer mixture for the (meth)acrylic prepolymer using an initiator, and further adding at least one selected from among an aromatic group-containing (meth)acrylate and an alicyclic group-containing (meth)acrylate thereto. The initiator, the cross-linking agent, and the additives may be further added to the adhesive composition.

Next, an adhesive layer according to one embodiment of the invention will be described.

The adhesive layer includes a cured product formed of the adhesive composition according to the embodiment of the invention.

The cured product may be prepared by coating the adhesive composition onto a matrix, followed by curing with light. Curing may include UV irradiation at a wavelength of 300 nm to 400 nm and at a dose of about 200 mJ/cm$^2$ to about 3,000 mJ/cm$^2$ using a typical UV lamp, such as a low-pressure lamp, a metal halide lamp, and the like, in an oxygen-free state. UV irradiation may be performed once or more.

The adhesive layer may have a modulus at −20° C. of about 0.3 MPa or less. For example, the adhesive layer may have a modulus at −20° C. of about 0.07 MPa to about 0.3 MPa. Within this range, the adhesive layer can exhibit good flexibility at low temperature to be used in a foldable display.

The adhesive layer may have a modulus at 25° C. of about 0.2 MPa or less, for example, about 0.01 MPa to about 0.2 MPa. Within this range, the adhesive layer can exhibit good flexibility at room temperature and good peel strength with respect to an adherend to prevent the adherend from being peeled off.

The adhesive layer may have a modulus at 80° C. of about 0.001 MPa or more, for example, about 0.001 MPa to about 0.1 MPa. Within this range, the adhesive layer can exhibit good flexibility and durability at high temperature.

The adhesive layer may have a peel strength of about 400 gf/in or more. Within this range of peel strength, the adhesive layer has good flexibility at low temperature to prevent delamination or bubble generation, slight lifting or appearance deformation upon 100,000 or more cycles of folding at low temperature. Preferably, the adhesive layer has a peel strength of about 400 gf/in to about 1500 gf/in.

The adhesive layer is optically transparent and is applicable to an optical display device. In one embodiment, the adhesive layer may have a single transmittance of about 80% or more, for example, about 80% to about 100%, in the visible spectrum (e.g. at a wavelength of 380 nm to 800 nm).

The adhesive layer may have a thickness of about 10 μm to about 100 μm, specifically about 10 μm to about 50 μm. Within this range, the adhesive layer can realize foldability while securing peel strength with respect to an adherend.

Next, an optical display device according to one embodiment of the invention will be described.

The optical display device may include the adhesive layer according to the embodiment of the invention. The adhesive layer may attach various adherends, for example, optical films including a display panel, a polarizing plate, a polar-izer, a retardation film, and the like, various elements including a reflective film, a brightness enhancing film, and the like, which are present in the optical display device.

The optical display device may include various display devices including a flexible display requiring flexibility, a flexible display, and the like.

MODE FOR INVENTION

Next, the present invention will be described in more detail with reference to some examples. However, it should be noted that these examples are provided for illustration only and are not to be construed in any way as limiting the present invention.

Example 1

100 parts by weight of a monomer mixture for a (meth)acrylic prepolymer as listed in Table 1, 100 ppm of an initiator (Irgacure 651, 2,2-dimethoxy-2-phenyl acetophenone, BASF), and 100 ppm of a chain transfer agent (n-decyl mercaptan) were mixed in a reactor. After replacing dissolved oxygen in the reactor with nitrogen gas for 30 minutes, the mixture was irradiated with UV light using a low-pressure mercury lamp for several minutes. Irradiation was continued until the (meth)acrylic prepolymer had a viscosity of 0.038 Pa·s at 40° C. Polymerization of the monomer mixture was completed by cooling the reactor while purging with air for 30 minutes, thereby preparing a (meth)acrylic prepolymer (weight average molecular weight: 1,000,000). Viscosity was measured by a method of measuring shear viscosity.

A liquid adhesive composition was prepared by adding 30 parts by weight of benzyl acrylate, 0.3 parts by weight of Irgacure 127 and 0.2 parts by weight of TPO as initiators, 0.2 parts by weight of a crosslinking agent (HDDA) to 100 parts by weight of the prepared (meth)acrylic prepolymer (copolymer of acrylic monomers).

Examples 2 to 6

Liquid adhesive compositions were prepared in the same manner as in Example 1 except that components of each of the adhesive compositions were changed as listed in Table 2. In Table 1, "-" means that a corresponding component is not present.

Comparative Examples 1 to 4

Liquid adhesive compositions were prepared in the same manner as in Example 1 except that components of each of the adhesive compositions were changed as listed in Table 2. In Table 2, "-" means that a corresponding component is not present.

Each of the adhesive compositions prepared in Examples and Comparative Examples was evaluated as to the properties listed in Tables 1 and 2. Results are shown in Tables 1 and 2.

(1) Viscosity (unit: Pa·s): Shear viscosity of the adhesive composition was measured. Specifically, shear viscosity of the adhesive composition was measured with respect to 0.5 g of the adhesive composition using a Brookfield viscometer RVDV-II+P CP (Spindle #51, 20 rpm) after adjusting the temperature of the adhesive composition to 40° C.

(2) Peel strength (unit: gf/in): Peel strength was measured with respect to an adhesive layer formed of the adhesive composition. A release polyethylene terephthalate (PET)

film was placed on a coating layer, which was formed by coating the adhesive composition to a thickness of 25 μm on a PET release film using a blade. An adhesive layer (thickness: 25 μm) was formed by curing the adhesive composition through irradiation using a low-pressure mercury lamp at 200 mJ/cm² and a metal halide lamp at 2,000 mJ/cm².

A sample was prepared by attaching a corona-treated PET film to an exposed surface of the adhesive layer, from which one PET release film was peeled off. The sample was cut to a size of 10 cm×2.5 cm (length×width). Then, the remaining PET release film was removed from the sample, which in turn was attached to a glass plate (soda lime glass) via the adhesive layer to prepare a specimen for measurement of peel strength. The corona-treated PET film was prepared by subjecting one surface of the PET film to corona treatment twice (total dose: 156 doses) while plasma discharging at 78 doses for each treatment.

The specimen was left at room temperature for 30 minutes and then secured to a TA.XT_Plus Texture Analyzer (Stable Micro Systems). Then, peel strength was measured upon peeling the entirety of the corona-treated PET film and the adhesive layer from the glass plate under conditions of peeling temperature: 25° C., peeling angle: 180°, and peeling rate: 300 mm/min.

(3) Modulus (unit: MPa): A release polyethylene terephthalate (PET) film was placed on a coating layer, which was formed by coating the adhesive composition to a thickness of 25 μm on a PET release film using a blade. An adhesive layer (thickness: 25 μm) was formed by curing the adhesive composition through irradiation using a low-pressure mercury lamp at 200 mJ/cm² and a metal halide lamp at 2,000 mJ/cm².

Modulus was measured in a temperature sweep test mode using a rheometer (ARES, Anton Paar, MCR-501) as a dynamic viscoelasticity meter at a shear rate of 1 rad/sec and at a strain of 1% under an auto-strain condition. A specimen for measurement of storage modulus was prepared by stacking multiple adhesive layers to form a laminate having a thickness of 400 μm, followed by punching the laminate using an 8 mm-diameter punching machine. Specifically, with a normal force of 1 N applied to the specimen using 8 mm jigs, storage modulus was measured on the specimen while elevating the temperature from −50° C. to 100° C. at a heating rate of 5° C./min.

(4) Flexibility (@−20° C.): A laminate was prepared by stacking a PET film (thickness: 50 μm), an adhesive layer (thickness: 25 μm) and a PET film (thickness: 50 μm), and was attached by a roller, followed by leaving the laminate for 12 hours at room temperature. Then, the laminate was cut into a specimen having a size of 140 mm×70 mm (length×width), which in turn was secured to a flexibility tester (CFT-2000, Covotech Co., Ltd.) by an adhesive (4965, Tesa Co., Ltd.). Here, the PET film was subjected to corona treatment and the adhesive layer was attached to one surface of the PET film subjected to corona treatment. The specimen was subjected to 100,000 cycles of folding in the longitudinal direction of the specimen at −20° C. such that a bent portion of the specimen had a radius of curvature of 3 mm at a folding rate of 30 cycles per minute, where 1 cycle refers to an operation of folding the specimen to have the radius of curvature, maintaining the specimen in a folded state for 1 second, and unfolding the adhesive film back to 180°. After 100,000 cycles of folding, a specimen suffered from delamination, bubble generation, slight lifting or appearance deformation was rated as x and a specimen suffering from no delamination, bubble generation, slight lifting or appearance deformation was rated as ○.

(5) Inkjet printing processability: A thin release film was attached to a coating layer, which was formed by depositing each of the adhesive compositions prepared in Examples and Comparative Examples through an inkjet head, followed by irradiation with UV light at 800 mJ/cm² to form a cured adhesive layer, which in turn was evaluated with the naked eye by measuring the thickness thereof. A specimen having a smooth appearance and a uniform thickness to be used as the adhesive layer was rated as ○ and a specimen having a rough appearance and an uneven thickness was rated as X.

TABLE 1

| | | Example | | | | | |
|---|---|---|---|---|---|---|---|
| | | 1 | 2 | 3 | 4 | 5 | 6 |
| Prepolymer | EHA | 83 | 83 | 83 | 83 | 83 | 83 |
| | HBA | 17 | 17 | 17 | 17 | 17 | — |
| | HEA | — | — | — | — | — | 17 |
| | Chain transfer agent (ppm) | 100 | 100 | 100 | 100 | 100 | 100 |
| | Mw | $1 \times 10^6$ | $1 \times 10^6$ | $1 \times 10^6$ | $1 \times 10^6$ | $1 \times 10^6$ | $1 \times 10^6$ |
| | Viscosity @40° C. (Pa·S) | 0.038 | 0.038 | 0.038 | 0.038 | 0.038 | 0.041 |
| (Meth)acrylate | ① | 30 | — | — | — | — | — |
| | ② | — | 30 | — | — | — | — |
| | ③ | — | — | 20 | — | — | — |
| | ④ | — | — | — | 30 | 30 | 30 |
| Initiator | Irgacure 127 | 0.3 | 0.3 | 0.3 | 0.3 | 0.3 | 0.3 |
| | TPO | 0.2 | 0.2 | 0.2 | 0.2 | 0.2 | 0.2 |
| Crosslinking agent | HDDA | 0.2 | 0.2 | 0.2 | 0.2 | — | 0.2 |
| | TMPTA | — | — | — | — | 0.2 | — |
| Viscosity (@40° C., Pa·S) | | 0.026 | 0.033 | 0.026 | 0.031 | 0.031 | 0.037 |
| Peel strength (gf/in) | | 1,000 | 850 | 700 | 1,100 | 950 | 1,030 |
| Modulus (MPa) | @−20° C. | 0.087 | 0.076 | 0.081 | 0.201 | 0.235 | 0.181 |
| | @25° C. | 0.040 | 0.010 | 0.010 | 0.016 | 0.019 | 0.031 |
| | @80° C. | 0.004 | 0.005 | 0.009 | 0.006 | 0.009 | 0.010 |

TABLE 1-continued

| | | Example | | | | | |
|---|---|---|---|---|---|---|---|
| | | 1 | 2 | 3 | 4 | 5 | 6 |
| Flexibility | @−20° C. | ○ | ○ | ○ | ○ | ○ | ○ |
| Inkjet printing processability | | ○ | ○ | ○ | ○ | ○ | ○ |

TABLE 2

| | | Comparative Example | | | |
|---|---|---|---|---|---|
| | | 1 | 2 | 3 | 4 |
| Monomer mixture | EHA | 83 | 83 | 83 | 83 |
| | HBA | 17 | 17 | 17 | 17 |
| | HEA | — | — | — | — |
| | Chain transfer agent (ppm) | — | 100 | 100 | 100 |
| | Mw | $2 \times 10^6$ | $1 \times 10^6$ | $1 \times 10^6$ | $1 \times 10^6$ |
| | Viscosity (40° C. (Pa·S) | 1.96 | 0.033 | 0.035 | 0.036 |
| (Meth)acrylate | ① | — | — | — | — |
| | ② | — | — | — | — |
| | ③ | — | — | — | — |
| | ④ | 30 | — | — | — |
| | ⑤ | — | 30 | — | — |
| | ⑥ | — | — | 30 | — |
| Initiator | Irgacure 127 | 0.3 | 0.3 | 0.3 | 0.3 |
| | TPO | 0.2 | 0.2 | 0.2 | 0.2 |
| Cross-linking agent | HDDA | 0.2 | 0.2 | 0.2 | 0.2 |
| Viscosity (@40° C., Pa·S) | | 1.96 | 0.032 | 0.033 | 0.035 |
| Peel strength (gf/in) | | 300 | 290 | 350 | 310 |
| Modulus (MPa) | @−20° C. | 0.381 | 0.031 | 0.412 | 0.157 |
| | @25° C. | 0.025 | 0.004 | 0.036 | 0.056 |
| | @80° C. | 0.020 | 0.002 | 0.026 | 0.040 |
| Flexibility | @−20° C. | X | X | X | X |
| Inkjet printing processability | | X | ○ | ○ | ○ |

*HBA: 2-ethylhexyl acrylate (LG Chemical Co., Ltd.)
*HBA: 4-hydroxybutyl acrylate (Osaka Organic Chemical Industry Co., Ltd.)
*HEA: 2-hydroxyethyl acrylate (LG Chemical Co., Ltd.)
*①: Benzyl acrylate
*②: Phenoxyethyl acrylate
*③: Tetrahydrofurfuryl acrylate
*④: Dicyclopentanyl acrylate
*⑤: Lauryl acrylate
*⑥: Methyl acrylate
*HDDA: 1,6-hexanediol diacrylate
*TMPTA: Trimethylolpropane triacrylate As shown in Table 1, the adhesive composition according to the present invention is applicable to a dispensing process or an inkjet printing process and an adhesive layer formed of the adhesive composition has a smooth appearance and a uniform thickness while securing good flexibility at low temperature.

Conversely, as shown in Table 2, the adhesive composition of Comparative Example 1 not satisfying the viscosity range of the present invention exhibited poor inkjet printing processability and poor flexibility at low temperature. The adhesive composition of Comparative Examples 2 to 4 not containing at least one selected from among an aromatic group-containing (meth)acrylate, an alicyclic group-containing (meth)acrylate, and a heteroalicyclic group-containing (meth)acrylate failed to have peel strength and modulus at −20° C. within the ranges according to the present invention, thereby exhibiting poor flexibility at low temperature.

It should be understood that various modifications, changes, alterations, and equivalent embodiments can be made by those skilled in the art without departing from the spirit and scope of the invention.

The invention claimed is:

1. An adhesive composition comprising:
   (i) a (meth)acrylic prepolymer having a hydroxyl group and an alkyl group, the (meth)acrylic prepolymer does not contain an aromatic group, an alicyclic group and a heteroalicyclic group; and
   (ii) at least one selected from among an aromatic group-containing (meth)acrylate, an alicyclic group-containing (meth)acrylate, and a heteroalicyclic group-containing (meth)acrylate,
   the adhesive composition having a shear viscosity of about 0.04 Pads or less at 40° C.,
   wherein an adhesive layer formed of the adhesive composition has a modulus of about 0.3 MPa or less at −20° C. and a peel strength of about 400 gf/in or more.

2. The adhesive composition according to claim 1, wherein the adhesive composition is a solvent-free liquid adhesive composition.

3. The adhesive composition according to claim 1, wherein the (meth)acrylic prepolymer having a hydroxyl group and an alkyl group comprises a (meth)acrylic prepolymer of a monomer mixture comprising about 10 wt % to about 40 wt % of a hydroxyl group-containing (meth)acrylate and about 60 wt % to about 90 wt % of an alkyl group-containing (meth)acrylate.

4. The adhesive composition according to claim 3, wherein the alkyl group-containing (meth)acrylate comprises a compound represented by Formula 1:

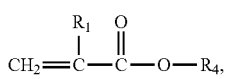

[Formula 1]

where $R_1$ is hydrogen or a methyl group and $R_4$ is an unsubstituted linear or branched $C_1$ to $C_{10}$ alkyl group.

5. The adhesive composition according to claim 1, wherein the (meth)acrylic prepolymer having a hydroxyl group and an alkyl group has a weight average molecular weight of about 1,500,000 or less.

6. The adhesive composition according to claim 1, wherein the (meth)acrylic prepolymer having a hydroxyl group and an alkyl group has a shear viscosity or about 0.05 Pa·s or less at 40° C.

7. The adhesive composition according to claim 1, wherein the at least one selected from among the aromatic group-containing (meth)acrylate, the alicyclic group-containing (meth)acrylate, and the heteroalicyclic group-containing (meth)acrylate is present in an amount of about 15 parts by weight or more relative to 100 parts by weight of the (meth)acrylic prepolymer having a hydroxyl group and an alkyl group.

8. The adhesive composition according to claim 1, wherein the aromatic group-containing comprises at least one selected from among (meth)acrylate, benzyl (meth)acrylate, and phenoxyethyl (meth)acrylate.

9. The adhesive composition according to claim 1, wherein the alicyclic group-containing (meth)acrylate comprises at least one selected from among dicyclopentanyl (meth)acrylate and dicyclopentenyloxyethyl (meth)acrylate.

10. The adhesive composition according to claim 1, wherein the heteroalicyclic group-containing (meth)acrylate comprises at least one selected from among tetrahydrofurfuryl (meth)acrylate and cyclic trimethylolpropane formal (meth)acrylate.

11. The adhesive composition according to claim 1, further comprising: at least one selected from among an initiator and a crosslinking agent.

12. An adhesive layer comprising a cured product formed of the adhesive composition according to claim 1.

13. An optical display device comprising the adhesive layer according to claim 12.

* * * * *